United States Patent
Bennett

(10) Patent No.: US 8,579,384 B2
(45) Date of Patent: Nov. 12, 2013

(54) SERVICE WORK BRAKE ARRANGEMENT

(75) Inventor: Mark A. Bennett, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 644 days.

(21) Appl. No.: 12/709,891

(22) Filed: Feb. 22, 2010

(65) Prior Publication Data

US 2010/0147406 A1 Jun. 17, 2010

Related U.S. Application Data

(62) Division of application No. 11/433,249, filed on May 12, 2006, now Pat. No. 7,690,735.

(51) Int. Cl.
*B60T 13/74* (2006.01)
(52) U.S. Cl.
USPC .............................................................. 303/3
(58) Field of Classification Search
USPC .................... 303/3, 9.66, 89, 122.04, 122.05, 303/122.15, 123, 191; 188/265, DIG. 2; 137/625.64, 625.6, 625.66; 251/26, 28
See application file for complete search history.

(56) References Cited

U.S. PATENT DOCUMENTS

| 5,190,357 | A | * | 3/1993 | Goldfein | 303/7 |
| 5,427,440 | A | * | 6/1995 | Ward et al. | 303/3 |
| 5,458,402 | A | * | 10/1995 | Jeffery | 303/13 |
| 2004/0187674 | A1 | * | 9/2004 | Bennett et al. | 91/418 |
| 2004/0256013 | A1 | * | 12/2004 | Fasolino et al. | 137/625.66 |

* cited by examiner

*Primary Examiner* — Bradley King
*Assistant Examiner* — Stephen Bowes
(74) *Attorney, Agent, or Firm* — Eugene E. Clair; Cheryl L. Greenly

(57) ABSTRACT

A vehicle air brake system is presented with an improved service work brake arrangement. The arrangement may provide a service work brake function or both a service work brake function and a parking brake function for the vehicle. The arrangement may provide an improved service work brake arrangement disposed within a housing for reducing the number of components and plumbing required to achieve this functionality versus prior known systems. The arrangement may utilize a pneumatic latching valve to deliver pressurized air for applying a vehicle's service brakes. The pneumatic latching valve opens upon receiving a pneumatic control signal from an electronically controlled valve and closes upon receiving a pneumatic control signal from another source. In addition, a controller and control logic may be provided for controlling the arrangement.

3 Claims, 5 Drawing Sheets

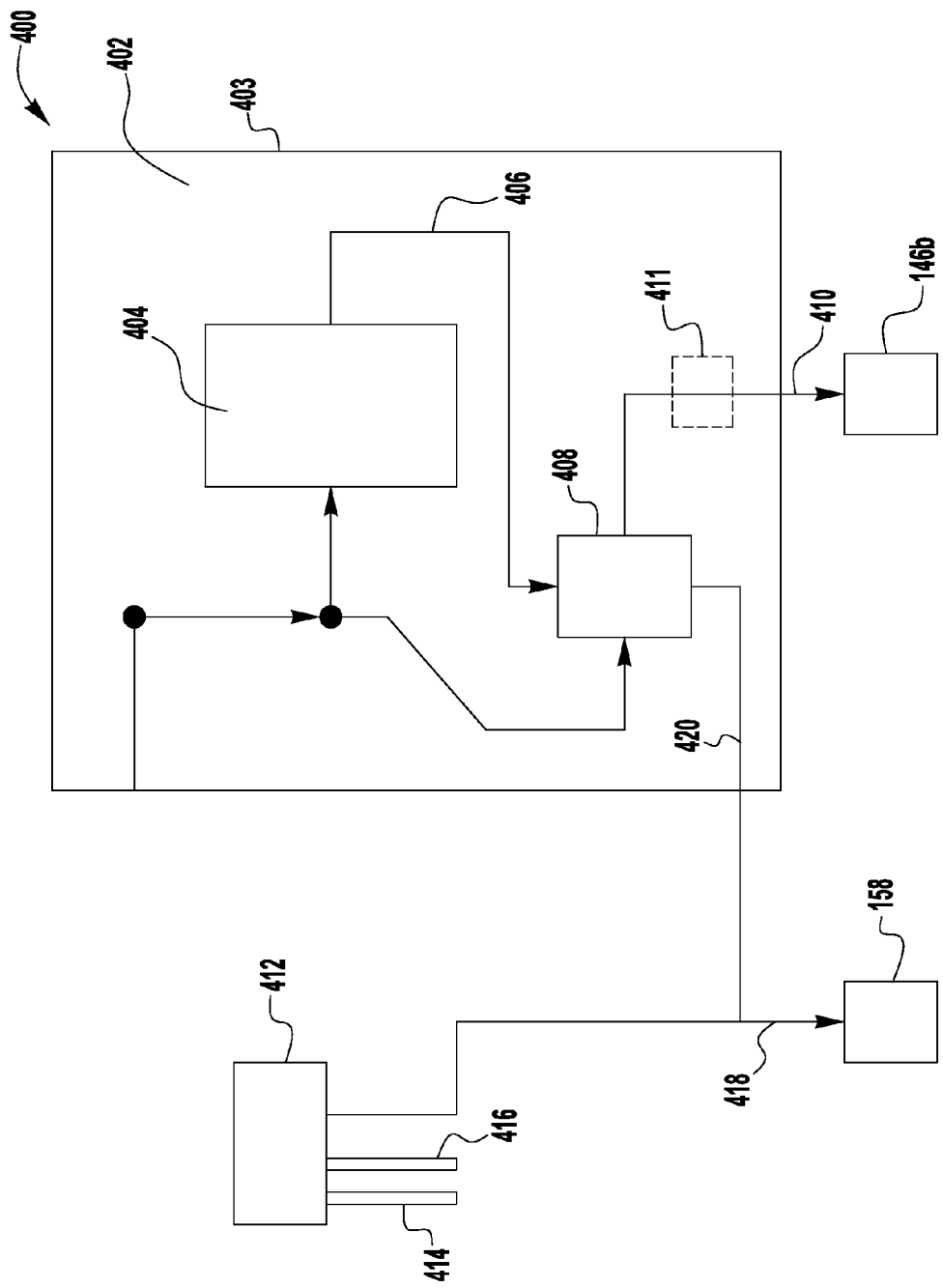

SERVICE WORK BRAKE ARRANGEMENT

CROSS-REFERENCE TO RELATED APPLICATIONS

The present application is a divisional of pending U.S. patent application Ser. No. 11/433,249 "Service Work Brake Arrangement," filed May 12, 2006, the entire content of which is herein fully incorporated by reference.

BACKGROUND OF THE INVENTION

Commercial vehicles, for example tractor trailers, often utilize air brake systems. A typical air brake system is capable of performing a service brake function and a park brake function. Service braking or normal braking refers to actuating the vehicle's brakes by depressing a brake pedal to deliver compressed air to a brake actuator. Service braking is used to slow the vehicle or bring the vehicle to a stop. Once stopped, the driver may wish to apply the park brakes to prevent the vehicle from rolling. Typical vehicle air brake systems utilize spring brakes to perform the park brake function. Spring brakes, as are known in the art, utilize spring force to engage the brakes and hold the vehicle stationary. Air pressure is used to disengage the brakes by compressing the spring in order to allow the vehicle to move.

Some vehicle air brake systems also include a work brake function for commercial vehicles that stop and start frequently, such as for example waste collection vehicles. Work braking refers to using a service brake application to perform a temporary park brake function. In other words, utilizing compressed air to apply the service brakes to keep the vehicle from rolling while the vehicle is parked. Utilizing service brakes in applications with frequent stopping and starting is preferable to utilizing park brakes because the service brakes are more durable and use less compressed air.

Typical work brake systems, however, are either not fail safe or have complicated fail safe systems. A fail safe work brake system will apply the park brakes if a particular vehicle condition exists or a contemplated specific system failure occurs, such as loss of compressed air. An example of a complex fail safe work brake system can be found in U.S. Pat. No. 5,458,402.

Furthermore, electro-pneumatic brake systems for commercial vehicles have been developed, though presently are not widely used. Present work brake systems, including known systems with complex pneumatic fail safe systems, have no provisions for providing fail safe operation in case of an electrical failure or driver error (e.g. the driver turns the ignition off while the work brake is engaged).

SUMMARY

The present invention relates generally to vehicle air brake systems. In particular the present invention relates to a vehicle air brake system with an improved service work brake arrangement. The arrangement improves the work brake system for either a pneumatic failure or an electrical failure. Thus, the logic of the system and method of the present invention may include both electrical and pneumatic components. The arrangement may provide a service work brake function or both a service work brake function and a parking brake function for the vehicle. The arrangement may provide an improved service work brake arrangement disposed within a housing for reducing the number of components and plumbing required to achieve this functionality versus prior known systems.

Furthermore, the invention may include a controller and control logic for controlling the arrangement. The controller and control logic may control the work brake and park brake functions, as well as other vehicle functions, based on data received from a variety of input sources. Thus, the controller may enable or disable certain vehicle functions as a function of the data received or inferences made from the data.

In one embodiment, the arrangement utilizes a pneumatic latching valve to deliver pressurized air for applying a vehicle's service brakes. The pneumatic latching valve opens upon receiving a pneumatic control signal from an electronically controlled valve and closes upon receiving a pneumatic control signal from another source or via spring return in absence of supply pressure. In another embodiment, an electronic control unit is employed to automatically engage and disengage the work brake function based on receiving input indicative of one or more of: the status of the vehicle, the status of the driver, the intent of the driver, and the plausibility of the driver's intent.

BRIEF DESCRIPTION OF THE DRAWINGS

The foregoing features of aspects of the present invention will become apparent to one skilled in the art to which the present invention relates upon consideration of the following description of the invention with reference to the accompanying drawings, in which:

FIG. 5 is a schematic representation of a valve arrangement of a third exemplary embodiment of the airbrake system according to the principles of present invention;

DETAILED DESCRIPTION

While various aspects and concepts of the invention are described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Figure 1:
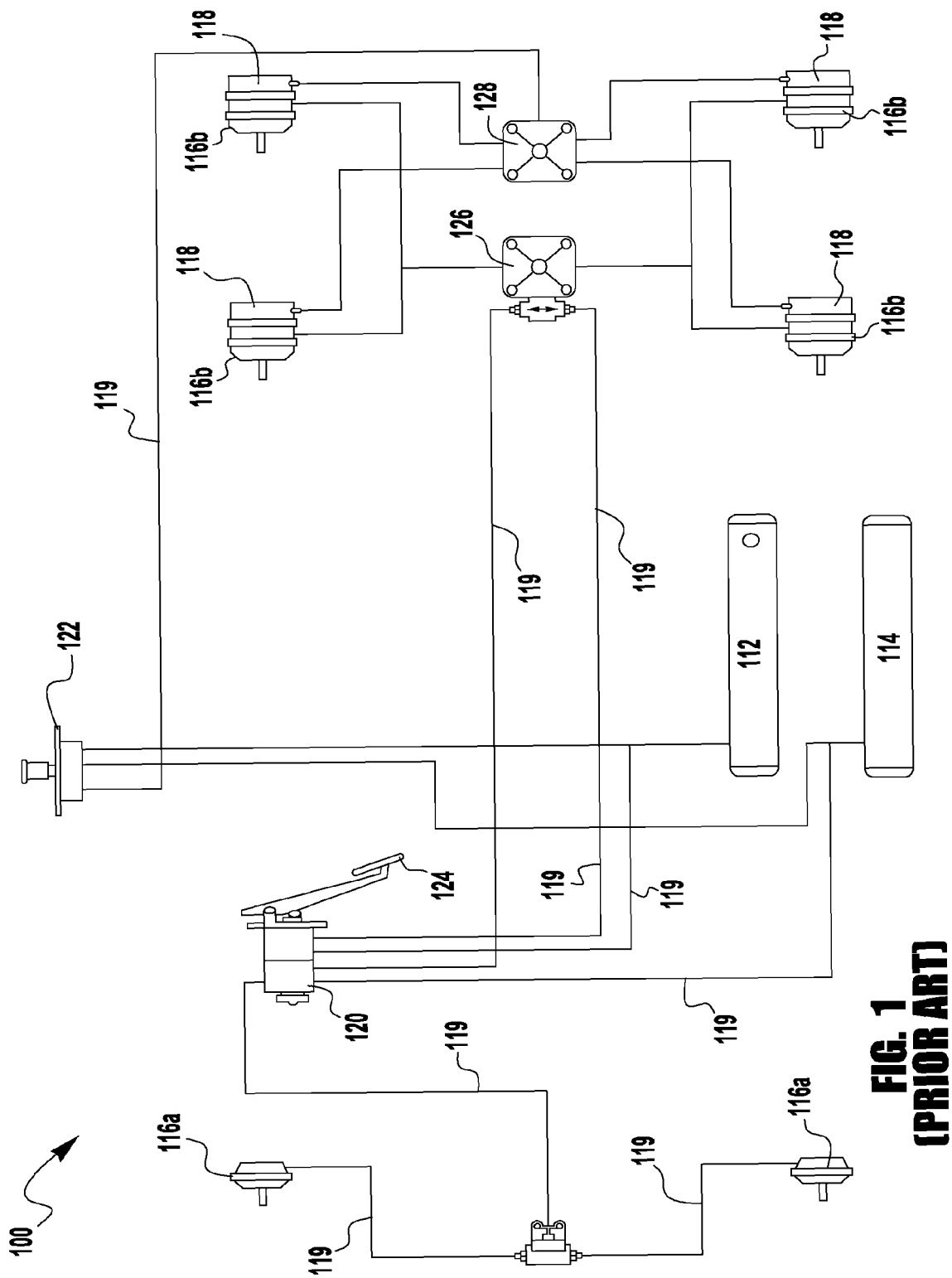
FIG. 1 is a partial schematic representation of a prior art air brake system for a vehicle.

To distinguish the characteristics of the present invention from a current state of the art air brake system, FIG. 1 provides a partial schematic representation of a prior art air brake system 100. The prior art brake system 100 includes a primary air reservoir 112 (typically for supplying a rear or trailer brake circuit) and secondary air reservoir 114 (typically for supplying a front or tractor brake circuit). The primary and secondary air reservoirs 112, 114 supply pressurized air to apply a set of front service brake assemblies 116a and rear service brake assemblies 116b, and for releasing a set of spring brake assemblies 118. A set of air lines 119 communicate the pressurized air from the reservoirs 112, 114 to the brake assemblies 116a, 116b, and 118.

Service brakes generally refer to the brake assembly located on the axles of a commercial vehicle, which are actuated via the application of pressurized air, as is known in the art. The spring brakes generally refer to the brake assembly located on the axles that utilizes a spring to apply the vehicle's parking brakes. Air pressure is used to keep the spring compressed and the parking brakes released, as is known in the art.

The air brake system 100 may also include a brake valve 120 and a parking control valve 122. The brake valve 120 includes a foot pedal 124, which opens the valve when the pedal is depressed. When open, the brake valve 120 allows pressurized air to flow from the reservoirs 112, 114 to a relay valve 126 for actuating the service brakes, as is known in the art. The parking control valve 122, which may be opened manually, allows pressurized air to flow from reservoirs 112, 114 to a relay valve 128 for releasing the parking brakes, as is known in the art. A typical prior art air brake system may also include a variety of additional valves and components, as is known in the art. For example, tractor protection valves, quick release valves, spring brake valves, etc. are often employed. These valves and components are known in the art and are omitted from the discussion and illustration of the prior art and exemplary embodiments of the present invention for simplicity. The brake system according to the present invention, however, may utilize these and other valves and components.

Figure 2:
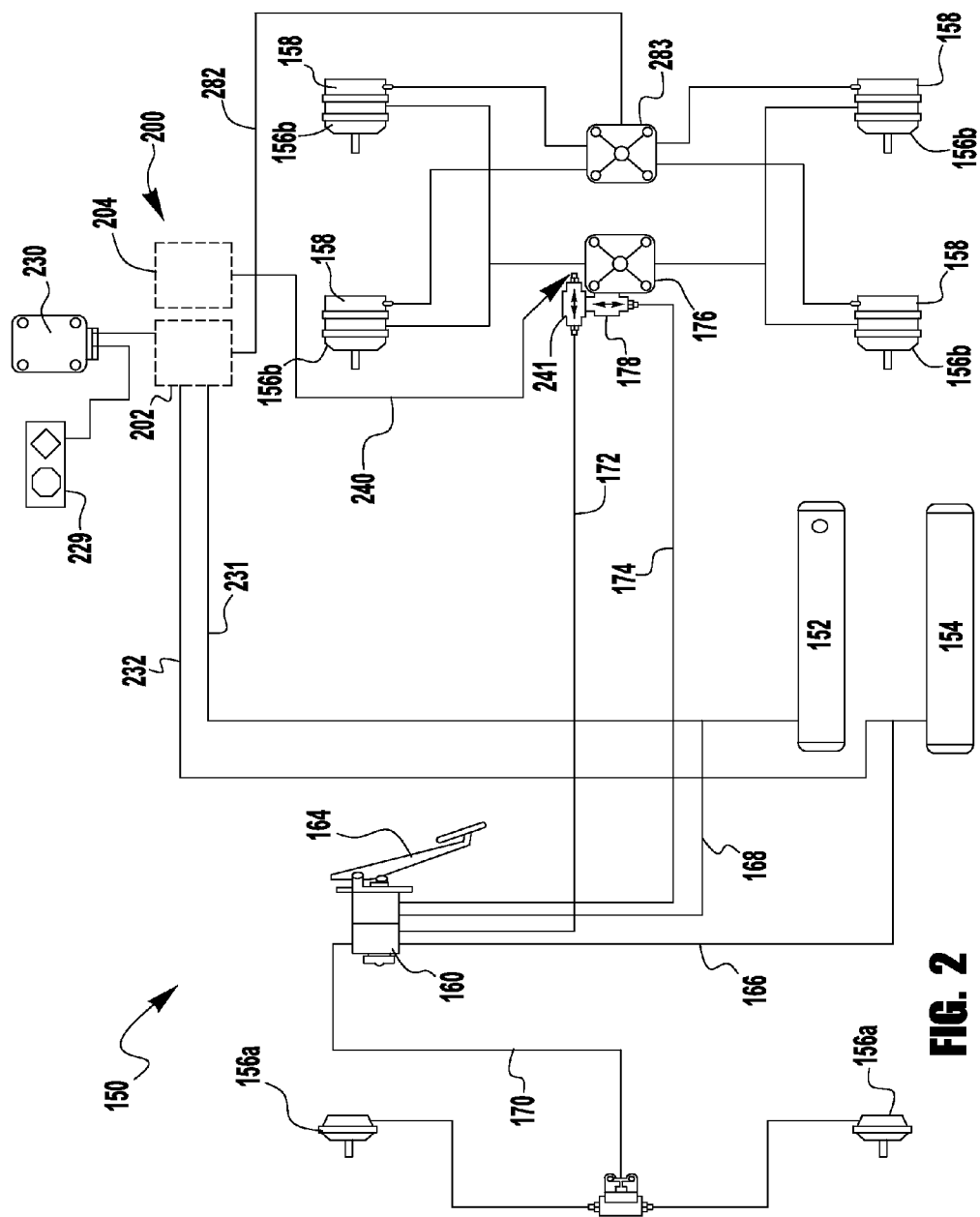
FIG. 2 is a partial schematic representation of an exemplary embodiment of an air brake system for a vehicle according to the principles of present invention.

FIG. 2 illustrates an exemplary embodiment of a pneumatic brake system 150 according to the present invention. Similar to the prior art pneumatic brake system 100 of FIG. 1, the pneumatic brake system embodiment in FIG. 2 may include a primary air reservoir 152 and secondary air reservoir 154 to supply pressurized air for applying a set of front service brake assemblies 156a and rear service brake assemblies 156b, and for releasing a set of spring brake assemblies 158. In the context of this invention, control or pilot air generally refers to a pneumatic signal for opening or closing a pneumatically actuated valve, while supply or delivery air generally refers to the pressurized air routed by valves and used to apply or release a terminal device, such as a spring brake or service brake.

The air brake system 150 may also include a brake valve 160 having a foot pedal 164, which opens the valve when the pedal is depressed. The brake valve 160 communicates with the primary air reservoir 152 and the secondary air reservoir 154 via air lines 166 and 168, respectively. When open, the brake valve 120 allows pressurized air to flow from reservoirs 152, 154 to the service brake assemblies 156a, 156b via air lines 170 and to the rear service brake assemblies 156b via air lines 172 and 174 for actuating the service brakes. A relay valve 176 (FIG. 2) may be installed between the rear service brake assemblies 156b and the brake valve 160 such that the air from the brake valve acts as control air for the relay valve, as is known in the art. The air lines 172 and 174 communicate with a two-way check valve 178 mounted to the control port of the relay valve 176. Thus, air from the reservoir with the higher air pressure exits the check valve to apply the rear service brakes 156b.

The pneumatic brake system 150 in FIG. 2 replaces the park control valve 122 of the prior art system 100 of FIG. 1 with a valve arrangement 200 that may perform the work brake control, park brake control, or both parking brake and service work brake control.

Figure 3:
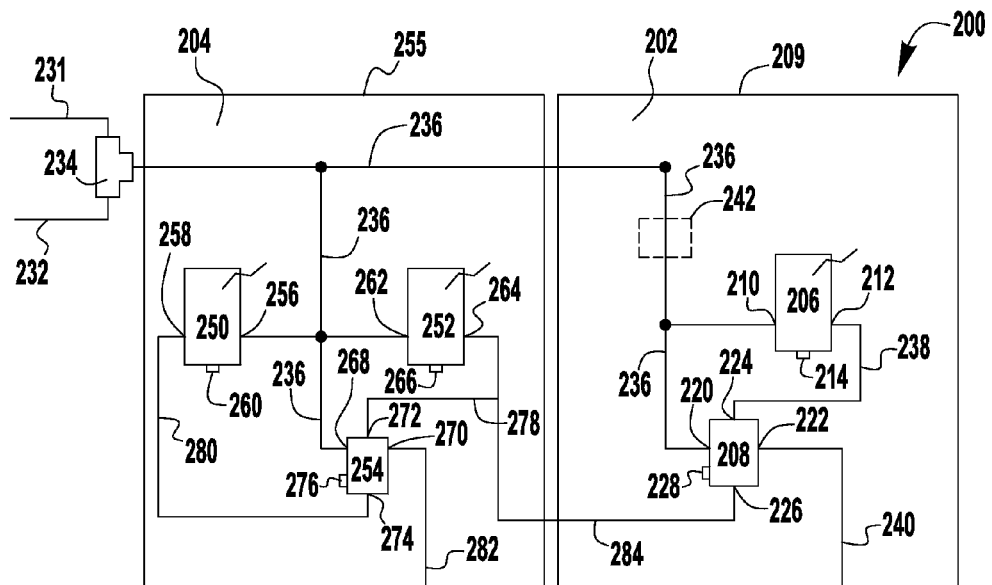
FIG. 3 is a schematic representation of an exemplary embodiment of a valve arrangement of the system of FIG. 2.

FIG. 3 is a schematic representation of an exemplary embodiment of a valve arrangement 200 according to the present invention. For ease of explanation, the valve arrangement 200 may be described in two sections: a service work brake section 202 and a park brake section 204. The service work brake section 202 includes a first valve 206 and a second valve 208 within a housing 209. The housing 209 may allow the first valve 206 and the second valve 208, or the functionality of the first and second valve, to be consolidated within single unit, thus reducing the number of components and plumbing within the pneumatic brake system 150.

The first valve 206 is adapted to open in response to an electronic signal and close when the electronic signal is discontinued. For example, the first valve 206 may be an electric control valve or a solenoid valve. In the exemplary embodiment of FIG. 3, the first valve 206 is a three-way, two-position, normally closed to delivery, normally open to exhaust, solenoid valve. However, other electrically controllable valves or pneumatic valves may be used, including, but not limited to, piezoelectric valves and micro machine valves.

The first valve 206 includes a pneumatic inlet 210, a pneumatic outlet 212, and an exhaust port 214. The two operational positions or modes of the electric control valve 206 are null or closed, and energized, delivery or open. When energized, the first valve 206 allows air flow through the valve from the inlet 210 to the outlet 212. When closed, the first valve 206 closes the path from the inlet 210 to the outlet 212, but opens the path from the outlet 212 to the exhaust port 214. Thus, when the first valve 206 is closed, any delivery air immediately downstream from the first valve may vent out of the exhaust port 214.

The second valve 208 is adapted to open in response to a first pneumatic signal and remain open when or if the first signal is discontinued. Further, the second valve 208 may be adapted to close in response to receiving a second pneumatic signal and remain closed when or if the second signal is discontinued. Thus, the second valve 208 may be a pneumatic latching valve. In the exemplary embodiment of FIG. 3, the second valve 208 is a three-way, two position, normally closed to delivery, normally open to exhaust, air-piloted latching valve with an automatic return to close feature, such as for example a spring return. Other valve types, styles, or models, however, may be employed. The automatic return to close capability of the second valve 208 will automatically move the valve from the delivery position to the closed position as supply pressure at an inlet 220 is reduced to a predetermined minimum. This capability greatly reduces the chance of the vehicle rolling between the time that air pressure is declining and the time that the park brakes are applied autonomously (i.e. pneumatically fail safe). The minimum can be influenced by selection of the spring installed, for example. An example of a suitable valve is a Bendix PP-5 Push-Pull Type Control Valve, adapted to be air-piloted. Other valve variants may also be used for second valve 208.

The second valve 208 includes an inlet 220, an outlet 222, a first control signal port 224, a second control signal port 226, and an exhaust port 228. The second valve 208 possesses the same two operational positions or modes as the first valve 206, although the input signal for the second valve 208 is pneumatic pressure, not electric current. When open, the second valve 208 allows air to flow through the valve from the inlet 220 to the outlet 222. When closed, the second valve 208 closes the path from the inlet 220 to the outlet 220, but opens a path from the outlet to the exhaust port 228. Thus, when the second valve 208 is closed, any delivery air immediately downstream from the second valve may vent out of the exhaust port 228.

The first valve 206 is in circuit communication with a device capable of sending or relaying an electronic signal. The device may be, for example, a manual, pneumatic, or electrical switch unit 229 and/or a controller or electronic processing unit 230 (shown in FIGS. 2 and 6 and discussed in detail below). The brake system 150 includes a source of pressurized control air (not shown) and a source of pressurized supply air (not shown). The primary air reservoir 152 and secondary air reservoir 154 may serve as the sources for the control and supply air, or separate sources may be provided. The source of pressurized control air and the source of pressurized supply air may be a single source or may be separate sources of pressurized air. In the exemplary embodiment of the valve arrangement 200, the source of pressurized signal air and the source of pressurized supply air are the same source. In particular, a pneumatic line 231 from the primary air reservoir 112 and a pneumatic line 232 from the secondary air reservoir 114 connect to a double check valve 234. Thus, air from the reservoir with the higher air pressure will flow through the double check valve to supply the pressurized control air and supply air to the valve arrangement 200.

The inlet 210 of the first valve 206 and the inlet 220 of the second valve 208 communicate with the pressurized air exiting the double check valve 234 via pneumatic lines 236. The first pneumatic control signal port 224 of the second valve 208 communicates with the pneumatic outlet 212 of the first valve 206 via a pneumatic line 236. The outlet 222 of the second valve 208 communicates with the rear service brake assemblies 156b via a pneumatic line 240. As shown in FIG. 2, the pneumatic line 240 may connect to an additional double check valve 241 which communicates with the control port of the relay valve 176 to access the service brake system. Thus, the pneumatic signal from the second valve 208 via the pneumatic line 240 can function as a supply signal to actuate a terminal device such as the service brakes 156b or may function as a control signal to control another device, such as for example the relay valve 176 or a brake valve actuator, that results in application of the service brakes. Furthermore, in the embodiment of FIG. 2, the pneumatic signal from the second valve 208 controls only the rear service brakes 156b. The brake system 150, however, could also be configured to allow the pneumatic signal to operate the front service brakes 156a.

An optional pressure regulating or reducing device 242, such as for example, a pressure regulator, may be included in the work brake section 202 to restrict the amount of air pressure being delivered through the second valve 208 when open from exceeding a predetermined amount. For example, the full pressure available from the source of pressurized supply air may be 100 psi. The pressure regulating device 242 may reduce the pressure actually delivered to the service brake assembly to 85 psi, for example. The lower applied pressure may reduce the stress on the service brakes during service work brake applications.

The second control signal port 226 of the second valve 208 communicates with a source of a pneumatic signal (described further below). Thus, while the first valve 206 supplies a pneumatic signal to the second valve 208 to open the second valve, a second pneumatic signal from a second source may be utilized to close the second valve 208. The source of the second pneumatic signal may be any source capable of sending a pneumatic signal to actuate the second valve 208, such as for example, an electronically or pneumatically actuated valve adapted to deliver a pneumatic signal.

The park brake section 204 of the valve arrangement 200 includes a third valve 250, a fourth valve 252, and a fifth valve 254 within a second housing 255. Thus, as with the first housing 209, the second housing 255 may allow the third valve 250, the fourth valve 252, and the fifth valve 254, or the functionality of the valves, to be consolidated within single unit to, reduce the number of components and plumbing within the pneumatic brake system 150. The first housing 209 and the second housing 255 may form a single common housing for both the service work brake section 202 and the park brake section 204. The first housing 209 and the second housing 255, however, may be separate housings forming separate assemblies. The separate assemblies, however, may be connected in a fixed manner, for example by one or more fittings, such that the first and second housing 209, 255 form a single assembly.

The third and fourth valves 250, 252 are substantially similar to the first valve 206 of the service work brake section 202 and the fifth valve 254 is substantially similar to the second valve 208 of the service work brake section 202. Thus, the third valve 250 includes a pneumatic inlet 256, a pneumatic outlet 258, and an exhaust port 260 and the fourth valve 252 includes a pneumatic inlet 262, a pneumatic outlet 264, and an exhaust port 266. Further, the fifth valve 254 includes an inlet 268, an outlet 270, a first control signal port 272, a second control signal port 274, and an exhaust port 276. The valves of the park brake section 204 possess the same two operational positions or modes as the valves of the service work brake section 202.

The third and fourth valves 250, 252 are in circuit communication with a device capable of sending or relaying an electronic signal. For example, the device may include a manual, pneumatic, or electrical switch unit, a controller or an electronic processing unit, such as for example the switch unit 229 and the processing unit 230 of FIG. 2.

The pneumatic inlet 256 of the third valve 250, the pneumatic inlet 262 of the fourth valve 252 and the inlet 268 of the fifth valve 254 communicate with pressurized air from the double check valve 234 via the pneumatic lines 236. For the third and fourth valves 250, 252, this air represents control air and for the fifth valve 254, this air represents supply air.

The first control signal port 272 of the fifth valve 254 communicates with the pneumatic outlet 264 of the fourth valve 252 via a pneumatic line 278. The second control signal port 274 of the fifth valve 254 communicates with the pneumatic outlet 258 of the third valve 250 via a pneumatic line 280. The outlet 270 of the second valve 254 communicates with spring brake assemblies 158 via a pneumatic line 282. A relay valve 283 may be installed between the spring brake assemblies 158 and the fifth valve 254 such that air from the parking brake section 204 acts as control air for the relay valve 283. Furthermore, the second control signal port 226 of the second valve 208 communicates with the outlet 264 of the fourth valve 252 via a pneumatic line 284.

The operation of the valve arrangement 200 can best be described in relations to the operation of a commercial vehicle, such as for example, a tractor trailer. In an initial state, the vehicle is parked with the parking brakes applied and the service work brakes not applied. The first, third, and fourth valves 206, 250, 252 are not energized, and the second and fifth valves 208, 254 are closed, such that pressurized supply air is not supplied to either the spring brake assembly 158 or the service brake assembly 156b.

To unpark the vehicle, the fourth valve 252 is energized, which supplies pressurized air in the form of a first pneumatic control signal to the first control signal port 272 of the fifth valve 254, and a second pneumatic control signal to the second control signal port 226 of the second valve 208. As a result, if the supply air pressure is greater than a predetermined amount, the fifth valve 254 opens allowing pressurized supply air to flow through the fifth valve to the spring brake assembly 22, releasing the spring applied parking brakes.

At the same time, the second pneumatic control signal received by the second valve 208 closes the second valve and opens the valve's exhaust port 226. As a result, any air in the pneumatic line 240 vents to atmosphere. Air would be present in the pneumatic line 240 if the service work brakes were applied. Thus, the act of releasing the parking brakes automatically releases the service work brakes, if applied. Because the second valve 208 and the fifth valve 254 latch into position, the first, third, and fourth valves 206, 250, 252 can be de-energized without impacting the position of either latching valve 208, 254. The vehicle is now in a rollable, unparked mode. Thus, because the first, third, and fourth valves 206, 250, 252 can be de-energized yet the vehicle may still be rolling with the parking brakes released, loss of electrical power or an electrical connection does not impact the status of the park brakes.

While in the rollable, unparked mode, the driver may desire to stop the vehicle and apply the service work brakes. To do so, the driver stops the vehicle by a normal service brake application. In this position, the fifth valve 254 is stilled latched in the open or delivering position, which keeps the park brakes released. The third valve 250 and the fourth valve 252 may be de-energized, which allows any air in pneumatic lines 278 and 280 to be relieved.

Once stopped, to hold the vehicle still, the driver may engage the service work brakes by energizing the first valve 206. As a result, the first valve 206 allows pressurized air to flow through the first valve to the first pneumatic control signal port 224 of the second valve 208 via the pneumatic line 238. The first pneumatic control signal to the second valve 208 opens the valve allowing pressurized air to flow through the second valve to the service brake assembly 156b via air line 240, thus applying the brakes in a service work brake application.

Because the second valve 208 latches into the open position, the driver may de-energize the first valve 206 without affecting the application of the service work brakes. Thus, if an electrical failure occurred while the service work brakes were applied, the service work brakes would remain applied despite the electrical failure. The second valve 208 does not change position as a result of discontinuing the electronic signal to the first valve 206.

Any of the air lines, such as air line 240, may be routed redundantly (i.e. two or more lines) if desired. Furthermore, the second valve 208 and the fifth valve 254 can be optionally equipped with status sensor. Thus, in the event of a failure air line 240, the vehicle can be parked autonomously or manually by energizing the third valve 250.

To transition from a mode where the service work brakes are applied to the rollable, unparked mode, the driver would follow the same steps used to unpark the vehicle, as described above. In particular, the driver would energize the fourth valve 252 as if desiring to remove the park brakes. Even if the park brakes are not applied, the act of energizing the fourth valve 252 releases both the park brakes (if applied) and the service work brakes (if applied).

When the vehicle has been stopped, the driver may wish to apply the park brakes to hold the vehicle still, as opposed to applying the service work brakes. To do so, the driver opens or energizes the third valve 250. Opening the third valve 250 allows pressurized air to flow through the third valve to the second pneumatic control signal port 274 of the fifth valve 254 via the pneumatic line 280. The second pneumatic control signal closes the fifth valve 254, which discontinues the pneumatic supply signal from the fifth valve to the spring brake assembly 158, thus applying the spring brakes. In addition, closing the fifth valve 254 opens the exhaust port 276 allowing pressurized air in the pneumatic line 282 to vent to atmosphere.

Figure 4:
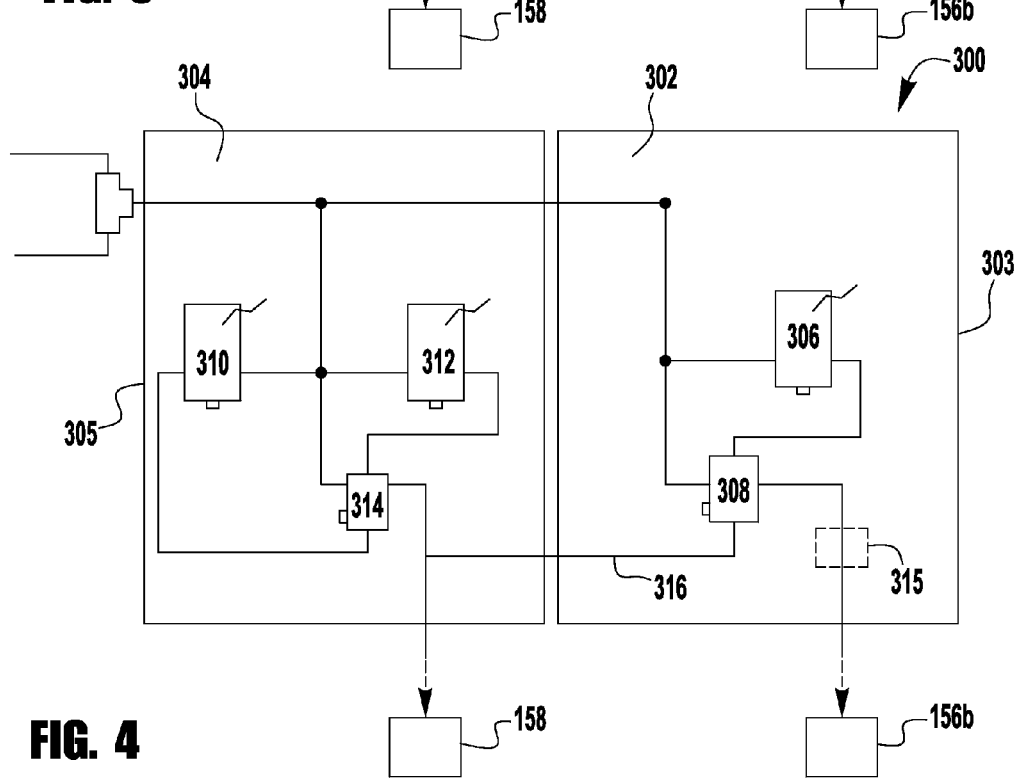
FIG. 4 is a schematic representation of a valve arrangement of a second exemplary embodiment of the air brake system according to the principles of present invention.

FIG. 4 is a second exemplary embodiment of the valve arrangement 300 according to the present invention. The valve arrangement 300 of FIG. 4 is substantially similar to the valve arrangement 200 of FIG. 3 in that it includes a service work brake section 302 within a first housing 303 and a park brake section 304 within a second housing 305. The valve arrangement 300 also includes a first valve 306, a second valve 308, a third valve 310, a fourth valve 312, and a fifth valve 314, which communicate with a source of pressurized control air and a source of pressurized supply air as described according to the valve arrangement 200 of FIG. 3. A pressure reducing device 315 may be included in the valve arrangement 400 to reduce the pressure delivered to the service brakes 156b.

The valve arrangement 300 of FIG. 4, however, modifies the source of a second pneumatic control signal for the second valve 308 (i.e. the pneumatic signal for closing the second valve). In the valve arrangement 200 of FIG. 3, the fourth valve 252 delivers the second pneumatic control signal to the second valve 208. Thus, the pneumatic control signal that opens the fifth valve 254 also closes the second valve 208. In the valve arrangement 300 of FIG. 4, the pneumatic control signal to close the second valve 308 is the pneumatic supply signal from the fifth valve 314. Therefore, when the fifth valve 314 is open, it sends a pneumatic signal to the spring brake assembly to release the spring brakes while at the same time sending a pneumatic control signal to the second valve 308 to close the valve, thus releasing the service work brakes, if applied.

FIG. 5 is a third exemplary embodiment of a valve arrangement 400 according to the present invention. The valve arrangement 400 of FIG. 5 includes a service work brake section 402 within a housing 403 that is substantially similar to the service work brake section 202 of the embodiment of FIG. 3. In particular, the service work brake section 402 includes a first valve 404 adapted to open in response to an electronic signal and close when the electronic signal is discontinued. When open, the first valve 404 delivers a pneumatic signal via an air line 406.

The service work brake section 402 also includes a second valve 408, which is adapted to open in response to first pneumatic signal and remain open when or if the first signal is discontinued. Further, the second valve 408 is adapted to close in response to receiving a second pneumatic signal and remain closed when or if the second signal is discontinued. When open, the second valve 408 delivers a pneumatic supply signal to a service work brake assembly 156*b* via an air line 410. A pressure regulating device 411 may be included in the valve arrangement 400 to reduce the pressure delivered to the The valve arrangement 400 of FIG. 5, however, illustrates how the service work brake section 402 may integrate with a purely pneumatic park control valve 412, such as for example, the park control valve 122 of the prior art brake system of FIG. 1. The parking control valve 412 may be a push-pull, manually operable on/off valve with an integral double check valve, however, other variants are possible. An example of a suitable park control valve is PP-DC Park Control Valve available from Bendix Commercial Vehicle Systems, LLC.

The parking control valve 412 communicates with the primary air reservoir 112 and the secondary air reservoir 114 (see FIG. 2) via air lines 414 and 416, respectively. When the parking control valve is open, the valve delivers pressurized air from either the primary reservoir 112 or secondary reservoir 114, whichever is higher pressure.

When open, the parking control valve 412 delivers a pneumatic supply signal to the spring brake assemblies 158 via an air line 418 to release the park brakes. The park control valve 412 may also communicate with the second valve 408 via air line 420 to supply a pneumatic supply signal to close the second valve 408, similar to the arrangement of FIG. 4.

Figure 6:
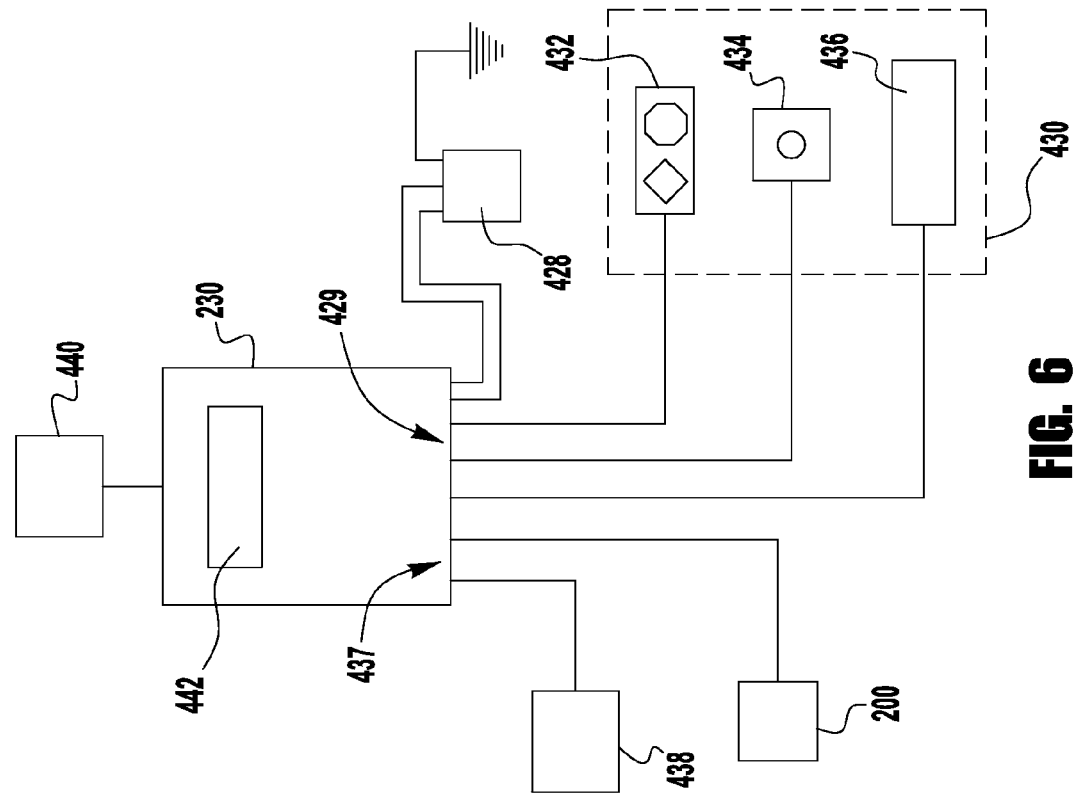
FIG. 6 is schematic representation of an exemplary embodiment of a controller for the system of FIG. 2.

Referring to FIG. 6, the controller 230, as discussed previously, may be capable of sending or relaying an electronic signal to the valve arrangement 200 for engaging and/or disengaging the work brake function and/or parking brake functions. The controller 230 may be, for example a vehicle electronic control unit (ECU), such as an antilock brake ECU, in communication with a voltage source 428 for supplying power to the controller. The controller 230, however, can be a wide variety of control devices, such as for example, a controller integral to a valve.

In an exemplary embodiment, the controller 230 may include one or more inputs 429 for receiving input data or signals indicative of the status or condition of the vehicle and/or operator from one or more input sources 430. The one or more input sources 430 may include a wide variety of input devices. For example, a first manual switch 432 may be provided to send a signal to the controller 230 to engage and/or disengage the park brakes on the tractor and trailer and a second manual switch 434 may be provided to send a signal to the controller to engage and/or disengage the work brakes. Furthermore, one or more sensors and/or switches 436 may be provided capable of sending signals to the controller 230 indicative of, for example, an operating condition or status of the vehicle, the status, intent, or request of the driver/operator, vehicle diagnostic information, or any other relevant information.

Based on the input signals, the controller 230 may include one or more outputs 437 for automatically delivering control signals to the valve arrangement 200 and/or one or more other output devices 438. The one or more output devices 438 may include for example, but not be limited to, devices capable or actuating or controlling an engine throttle, a vehicle transmission, a speed governor, and status enunciators (indicator lights, displays, audible devices, etc.).

The controller 230 may include control logic, which may be stored in memory 440, and a processor for applying the logic 442. The memory 440 may or may not be integral to the controller 230. The controller 230 may implement the control logic to analyze the information from the input devices 430 in order to determine a proper course for action, which may include intervening in the operation of the vehicle to automatically enable, disable, or control a vehicle system or device.

Figure 7:
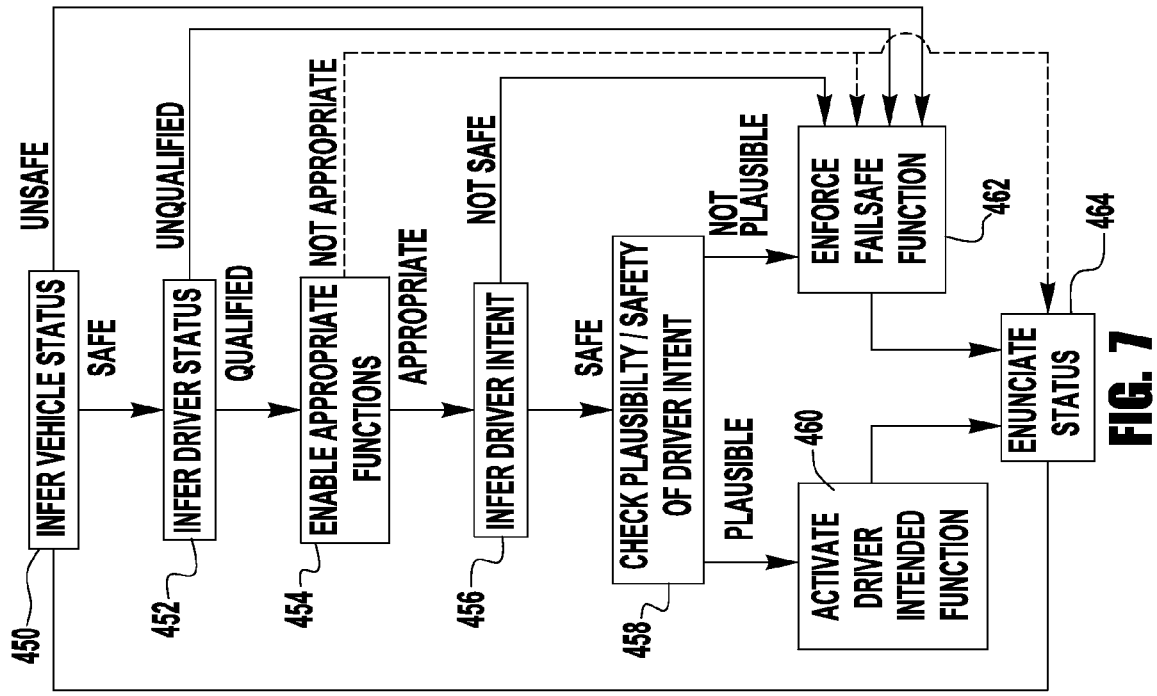
FIG. 7 is a flow chart of an exemplary embodiment of control logic for the controller of FIG. 6.

FIG. 7 presents a flowchart of an exemplary embodiment of the logic of the controller 230. The logic may include the steps of inferring the status of the vehicle 450, inferring the status of the driver or operator 452, enabling appropriate vehicle functions 454, inferring the driver/operator intent 456, checking the plausibility of the driver/operator intent 458, activating the driver-intended function 460, enforcing a failsafe function 462, and enunciating the status 464. The logic may be configured to continually repeat the steps while the controller/vehicle is powered on.

In the step of inferring the status of the vehicle 450, the controller 230 may receive data from the one or more input sources 430, and based on the data received, the controller may determine whether the vehicle is in a SAFE or UNSAFE status. The data from the one or more input sources 430 may include, but not be limited to, vehicle speed, engine rotational speed, transmission gear engaged, vehicle voltage, and air brake system supply pressure (park brake circuit air pressure and service brake circuit air pressure). One of ordinary skill in the art will appreciate that the controller 230 may utilize a wide variety of data configured in a wide variety of ways. For example, the controller 230 may receive an indication of vehicle speed directly from a vehicle speed sensor or may infer/determine vehicle speed from data indicative of engine rotational speed and throttle position.

A SAFE status and an UNSAFE status may depend on a variety of factors, such as user preference, vehicle configuration, vehicle options, and the specific embodiment of the present invention being employed. These factors may be predetermined and stored in memory 440 or may be inferred from input data received.

A SAFE vehicle status may include, but not be limited to, a determination that one or more vehicle systems are diagnostically sound (e.g. air pressure and electrical integrity of an air brake system are sufficient), the vehicle being stopped or moving very slowly, and the auxiliary and/or Power-Take-Off functions being turned off or properly stowed. Thus, an UNSAFE vehicle status may include, but not be limited to, one or more systems or components being diagnosed as faulty, the vehicle being in motion, and the auxiliary and/or Power-Take-Off functions (e.g. a refuse compactor, passenger doors, etc.), not being disabled or properly stowed. One of ordinary skill in the art will appreciate that the combination of input data indicative of a SAFE or UNSAFE status may be predetermined at the user's discretion and stored in memory to be referenced by the controller 230 to make the status determination.

If the vehicle status is determined to be UNSAFE, the controller 230 may enforce a failsafe function 462. Failsafe functions may include any action taken by the controller 230 to alter the vehicle status from a state determined to be unsafe or inappropriate to a state determined by the controller to be safer or more appropriate. For example, the controller 230 may prohibit an unsafe stationary vehicle from moving, may automatically brake a vehicle rolling away without a driver present, may place the vehicle into a Limp-To-Roadside mode by allowing timed durations of low-speed maneuvers to move the vehicle from an unsafe or undesired location, may prohibit brake drag that could lead to risk of fire, may enunciate the unsafe condition while the vehicle is moving, and may disable one or more functions when stopped. Other failsafe functions, however, are possible and may be implemented by the controller 230.

The failsafe functions may be effectuated in a variety of ways. Some possible actions by the controller 230 in order enforce a failsafe function include, but are not limited to, automatically applying the park brakes, prohibiting manual release of the park brakes, automatically applying the work brake, automatically releasing the work brake, prohibiting engagement of a non-neutral transmission gear, disabling a vehicle starter motor, disabling a vehicle throttle, operating a speed governing device, and disabling an auxiliary function or Power-Take-Off function.

If the controller 230 determines that the vehicle is in a SAFE status, then the controller may execute the step of inferring the driver status 452. One of ordinary skill in the art, however, will appreciate that the logic steps illustrated in FIG. 7 may be accomplished in a different order than presented. The steps are presented in the order shown in FIG. 7 for convenience only.

The controller 230 may receive data from one or more input sources 430. Based on the data received, the controller 230 may determine whether the driver is QUALIFIED or UNQUALIFIED. Inferring the driver status may include identifying that the operator is present and is authorized to operate the vehicle. The data received from the one or more input sources 430 may be indicative of, but not be limited to, vehicle door status, ignition key status, driver restraint status, the status of various switches, the control status of various vehicle systems, and time histories for each of the status mentioned.

A QUALIFIED driver status may include, for example, but not be limited to, the driver being present in the vehicle, which may be indicated by a seat switch or driver restraint switch, the driver being in control of the vehicle (i.e. driver control input sensed), the driver successfully enabling the vehicle (e.g. ignition has been keyed-on), and the driver passing an identification verification (e.g. a proper identification badge has been swiped or a proper code has been entered). Other criteria, however, may also be used to define a QUALIFIED status. For example, the identification verification may include the qualification level of an individual operator (e.g. driver-in-training, fully trained, service personnel). An UNQUALIFIED status, therefore, may be defined as a failure to meet one or more criteria for a QUALIFIED status.

If the controller 230 determines that the driver status is UNQUALIFIED, then the controller may enforce a failsafe function 462. If the controller 230 determines that the driver status is QUALIFIED, then the controller may execute the step of enabling appropriate functions 454. Based on the vehicle status and driver status inferred in steps 450 and 452, respectively, the controller 230 may enable only those functions determined to be APPROPRIATE and disable those functions determined to be INAPPROPRIATE. The controller 230 may enable or disable any vehicle functions which it may control. Examples of functions the controller 230 may control include, but are not limited to, the park brake function, the work brake function, transmission gear change, and speed governing.

As an example, for a SAFE vehicle status and a QUALIFIED driver status, the controller 230 may enable the work brake arrangement. As discussed above, a SAFE vehicle status may include a verification that the vehicle is stopped or only moving slowly and that the air brake system supply pressure is adequate. Thus, the overall condition of the vehicle may be appropriate for utilizing a work brake function. Furthermore, the functions considered appropriate may depend on the level of qualification of the operator. For example, service personnel, tow truck drivers, and drivers-in-training may have different vehicle functions enabled for them, thus the controller 230 may offer different operational capabilities based on the level of qualification of the operator. As shown by the dashed line in FIG. 7, inappropriate functions may be disabled via the step of enforcing a failsafe function 462 as described above.

For those APPROPRIATE functions, the controller 230 may execute the step of inferring the driver's intent 456. The controller 230 may receive data from the one or more input sources 430 that may be indicative of driver actuation. For example, a door switch may indicate that the driver has opened or closed the door, or a driver restraint switch may indicate that the driver has fastened or released the seat belt. Based on data indicative of driver actuation, the controller 230 may infer the driver's intent. Examples of the driver intent may include, but are not limited to, the intent to leave the vehicle, the intent to move the vehicle, the intent to park the vehicle, and the intent of the driver to work brake the vehicle. Thus, in order to infer driver intent, the controller 230 may, for example, utilize data indicative of the door being opened or closed, the ignition key being turned on or off, the engine being started or stopped, the park brake switch being actuated, and a certain transmission gear being selected.

The controller 230 may infer that the driver's intent is UNSAFE. For example, combinations of driver intent that may be deemed UNSAFE may include, but not be limited to, the driver intending to park a moving vehicle, the driver intending to work brake a vehicle while the park brakes are applied, or the driver intending to leave a moving vehicle. If the controller 230 determines that the driver's intent is UNSAFE, the controller may enforce a failsafe function 452.

If the controller 230 determines that the driver's intent is SAFE, then the controller may execute the step of checking the plausibility/safety of the driver's intent 458. The controller 230, thus, may cross check the inferred intent of the driver as a plausible request in order to rule out erroneous sensor readings not able to be detected. In addition, the controller 230 may execute a safety check that may include, but not be limited to, checking for switch or sensor failure, checking for electronic control unit failure, checking for low system voltage or air pressure, and checking for failure of a communication link.

Furthermore, during the step of checking the plausibility of the driver's intent, the controller 230 may check for attempts by the driver to defeat/override the system, such as for example, the driver taping a door switch to indicate that it is closed when the door is actually open. As an example, the controller 230 may infer that a qualified driver intends to move the vehicle by selecting a forward gear and opening the throttle. The intent of the driver may be cross-checked with the status of the park brake and the work brake. If the park brake or work brake are engaged, the controller 230 may determine that the driver's intent is not plausible (e.g. the vehicle should not/cannot be operated when the park brake or work brake are engaged). As a result, the controller 230 may disable the throttle until the driver releases the park brake or work brake. Thus, if the controller 230 determines that the driver's intent is not plausible, then the controller may enforce a failsafe function 462, as described above. Alternatively, the controller 230 may automatically release the park brake or work brake if input data indicates additional conditions are met, such as for example, the seat is occupied, the door is shut, the restraint is buckled, the throttle demand is high (possibly indicating an emergency condition).

If the controller 230 determines that the driver's intent is plausible, then the controller may activate the driver-intended functions 460. Driver-intended functions may be any functions that the driver/operator would request the vehicle to perform that the controller 230 may discern or have a priori knowledge of Driver-intended functions that the controller 230 may potentially activate (i.e. allow the driver to manually request) may include, but not be limited to, applying/releasing the park brake, applying/releasing the work brake, engaging a non-neutral transmission gear, actuating the vehicle throttle, operating an auxiliary function or Power-Take Off function, and cranking the starter motor.

The controller 230 may also send an output signal to enunciate the status of the vehicle during any of the steps performed by the controller. Thus, output devices capable of enunciating the vehicle status may be provided in communication with the controller 230. Status enunciators may include, but not be limited to, LCD text messages, indicator lights, and audible devices. For example, operational status indicators, such as a park brake indictor light or a work brake indicator light, may be provided. The controller 230 may toggle the operational status indicators on and off with each successful state transition (e.g. park brake is released), thus the meaning of the indicators may be self-teaching to the operator/driver. Audible indicators, such as for example a pleasant chime, may also accompany visual indicators or stand alone to reassure the operator that a successful operation has been completed.

In addition, fault indicators, such as a park brake fault light, a work brake fault light and/or a Limp-to-Roadside indicator light may be provided. The fault indicators may be tested during each key-on of the vehicle, but may generally remain off unless the controller 230 detects a fault or enters the Limp-to-Roadside mode. Audible indicators (e.g. a disconcerting buzz) may accompany the visual fault indicators or stand alone to reinforce that some risk has been detected.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A valve arrangement comprising:
    a housing;
    a first valve within the housing, the first valve adapted to deliver a first control signal;
    a second valve within the housing, the second valve adapted to deliver a pneumatic signal upon receiving the first control signal from the first valve, the second valve in communication with a vehicle service brake assembly; the vehicle service brake assembly adapted to apply as a result of the second valve delivering the pneumatic signal; wherein the second valve continues to deliver the pneumatic signal when the first control signal is discontinued;
    a second housing;
    a third valve adapted to deliver a pneumatic control signal upon receiving an electronic signal;
    a fourth valve adapted to deliver a pneumatic control signal upon receiving an electronic signal wherein the fourth valve communicates with the second valve and the second valve discontinues delivering the pneumatic signal upon receiving the pneumatic control signal delivered by the fourth valve; and
    a fifth valve in communication with a vehicle spring applied parking brake assembly, the third valve and the fourth valve; the fifth valve adapted to open upon receiving the pneumatic control signal from the fourth valve and close upon receiving the pneumatic control signal from the third valve, wherein the fifth valve delivers a pneumatic signal when open; the spring applied parking brakes adapted to release as a result of the pneumatic signal delivered by the fifth valve.

2. A valve arrangement for a commercial vehicle, comprising:
    a housing;
    a first electronically actuated valve within the housing, the first electronically actuated valve adapted to open upon receiving an electronic signal and deliver a first pneumatic control signal when open;
    a first pneumatic latching valve within the housing, the first pneumatic latching valve in communication with the first electronically actuated valve, the first pneumatic latching valve adapted to open upon receiving the first pneumatic control signal and deliver pressurized supply air when open for applying a service brake assembly on the vehicle;
    a second housing;
    a second electronically actuated valve within the second housing, wherein the electronically actuated valve is adapted to open upon receiving an electronic signal and deliver a second pneumatic control signal when open;
    a third electronically actuated valve within the second housing, wherein the third electronically actuated valve is adapted to open upon receiving an electronic signal and deliver a third pneumatic control signal when open; and
    a second pneumatic latching valve within the second housing, the second pneumatic latching valve in communication with the second and the third electronically actuated valves, wherein the second pneumatic latching valve is adapted to open upon receiving the third pneumatic control signal from the third electronically actuated valve and close upon receiving the second pneumatic control signal from the second electronically actuated valve, wherein second pneumatic latching valve is adapted to deliver a pneumatic signal when open for releasing a spring brake assembly on the vehicle, wherein the second pneumatic latching valve communicates with the first pneumatic latching valve, and wherein the first pneumatic latching valve is adapted to close upon receiving the pneumatic signal delivered by the second pneumatic latching valve.

3. The valve arrangement of claim 2 wherein the second pneumatic latching valve automatically closes when a pressure of the pressurized supply air is at or below a predetermined amount.

* * * * *